United States Patent [19]

Smith

[11] 3,996,802

[45] Dec. 14, 1976

[54] DEVICE FOR TESTING STERILIZATION APPARATUS

[76] Inventor: Robert F. Smith, 1023 Troy Court, Troy, Mich. 48084

[22] Filed: Sept. 11, 1975

[21] Appl. No.: 612,333

[52] U.S. Cl. .................................. 73/356; 73/358; 116/114.5
[51] Int. Cl.² .................... G01K 11/20; G01K 1/02
[58] Field of Search .................... 73/352, 356, 358; 116/114 V, 114 Y, 114.5

[56] References Cited

UNITED STATES PATENTS

| | | | |
|---|---|---|---|
| 1,894,015 | 1/1933 | Bernstein | 116/114.5 X |
| 2,579,738 | 12/1951 | Hargreaves | 73/358 |
| 3,114,349 | 12/1963 | Schuman | 116/114 V |
| 3,523,011 | 8/1970 | Bhiwandker et al. | 73/356 X |
| 3,695,903 | 10/1972 | Telkes et al. | 116/114.5 |
| 3,754,465 | 8/1973 | Romito et al. | 73/356 X |

*Primary Examiner*—Richard C. Queisser
*Assistant Examiner*—John S. Appleman

[57] ABSTRACT

A device for testing the level, uniformity and duration of the temperature in a sterilization apparatus, such as a steam sterilizer or the like. The device comprises a unitary support means adapted to be positioned in the sterilization apparatus. First temperature responsive means is arranged in a predetermined manner on one surface of the support means. The first means is adapted to change condition, e.g., color, when exposed to a predetermined temperature to indicate the uniformity of the temperature to which the support means is exposed in the sterilization apparatus. A second temperature responsive means is mounted on the support means substantially at the center portion thereof. In practice, the second means changes condition when exposed to a selected temperature for a predetermined time period, thereby indicating whether the center portion of the support means has been exposed to the selected temperature for a sufficient time period. The second means may also be used to indicate excessive conditions such as temperature and/or time which could be due to superheating or other sterilization apparatus malfunction.

6 Claims, 1 Drawing Figure

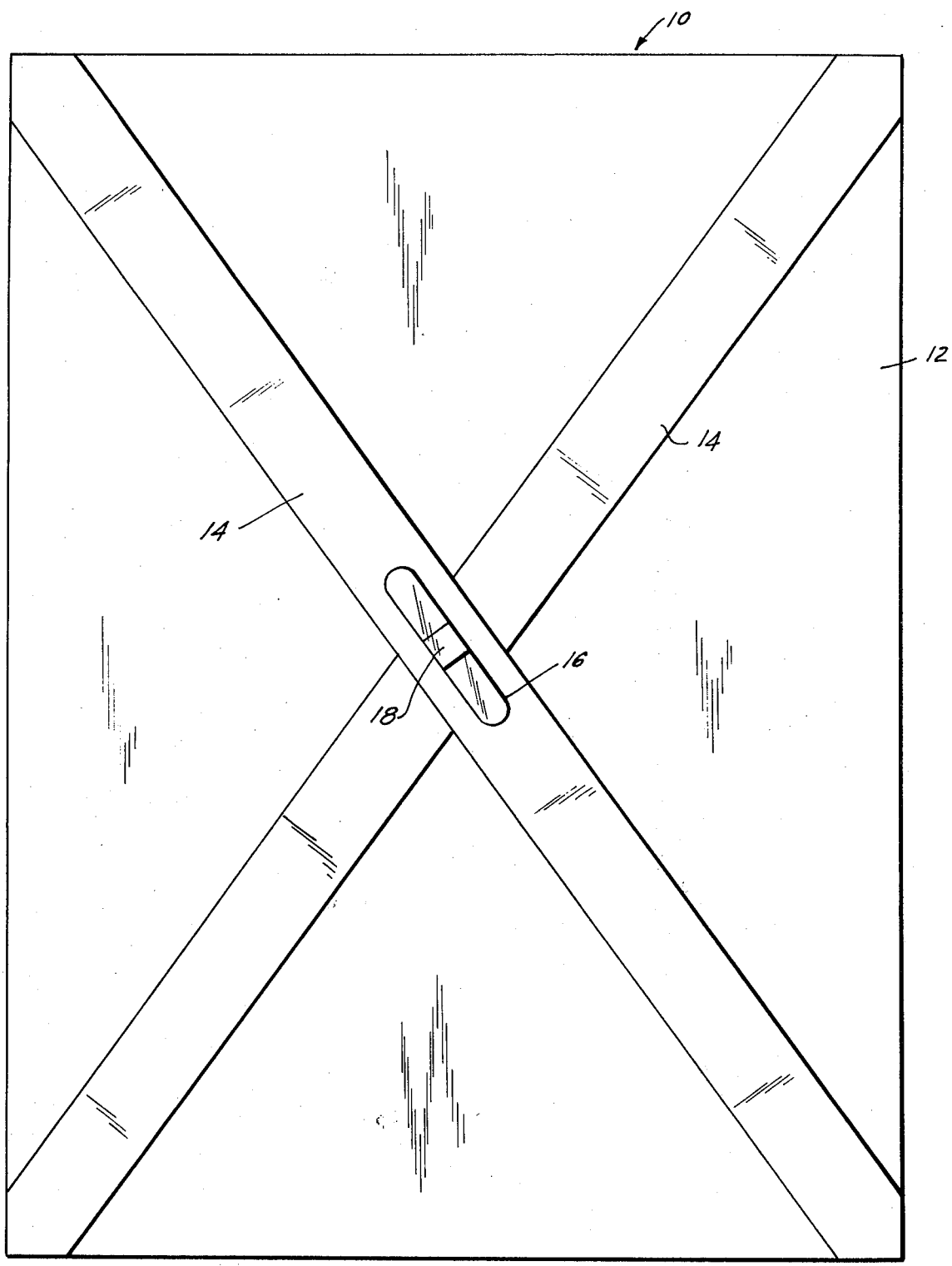

DEVICE FOR TESTING STERILIZATION APPARATUS

BACKGROUND OF THE INVENTION

This invention relates generally to a device for testing sterilization apparatus and, more particularly, to such a device for testing the level, uniformity and duration of the temperature in sterilization apparatus used in hospitals and the like.

The most fundamental responsibility of a hospital is to return patients to society in no worse condition than when they entered. Probably the greatest hindrance to fulfilling this responsibility is infections that patients acquire while in the hospital. The effectiveness of hospitals in protecting their patients (and themselves against lawsuits) is directly related to the effectiveness of their infection control program. This is essentially a health care quality assurance program.

Since most of today's hospitals do a fairly good job of supplying sterile supplies and equipment, a tigntened up sterilization quality program usually will not greatly reduce the infection rate. The primary reason for a good quality sterilization assurance program is not so much to reduce the current infection rate but is rather to reduce the chances for catastrophic outbreak of postoperative infection. Since large amounts of materials are processed and quickly used, a failure in the sterilization process has the potential for disaster. Sterilization failure during a single shift could result in hundreds of infections before the cause was found an eliminated. Therefore, it is imperative that the hospital use all reasonable quality control measures to insure against sterilization failure.

Sterilization by steam is the preferred method of sterilization in hospitals throughout the world. Alternate systems such as gas, liquids, and hot air are used only where steam sterilization cannot be used. The reasons why steam sterilization is preferred are that: (1) Its action is reliable, well understood, and predictable. (2) Steam is readily available from the hospital steam plant. (3) The equipment and its operation and maintenance are relatively inexpensive. )4) In contacting cool surfaces, the steam condenses, giving up tremendous heat and through contraction draws more steam into the cooler area which is thus quickly heated.

Steam kills microorganisms by coagulating the proteins. To do this efficiently, the steam must be saturated or in other words "almost wet" or on the border between the gaseous and vapor states. Dry steam (superheated steam) is a very inefficient sterilant, about equivalent to hot air. If the steam is superheated, it will not quickly penetrate dressing packs since the only mechanism for heating will be slow convection, resulting in cool air pockets. This is in contrast to the fast convection occurring when saturated steam condenses on cool surfaces, contracts, thus bringing in fresh steam and forcing out the residual air.

The chief technical difficulty in steam sterilization is the removal of air. Air causes difficulty because it forms pockets at the center of packs and forms insulating layers over the surfaces. In ordinary downward displacement sterilizers, the steam (being lighter than air) moves downward from the fop, assisted by successive condensation and evaporation. The air is bled off at the bottom of the sterilizer through the steam trap until hot steam contacts the trap and causes it to close. Hopefully, when the trap closes all air has been removed from the chamber. However, if packs are wrapped too tightly or are too large, if the steam trap is out of adjustment and closes too quickly, if steam goes around rather than through a dense portion of the load, or if other porblems occur, air will be left in the sterilizer and sterilization failure will occur. More modern sterilizers use vacuum extraction to assist in removal of air, thus shortening the sterilization cycle. However, experience has shown that this process can be defeated by inadequate pumping or by air leaks. Sometimes steam injection during the vacuum cycle is used but even in these type units a failure due to cool air pockets can occur.

There are many reasons why sterilization quality control is essential. First, viable microorganisms are invisible and thus sterilization failures are not immediately apparent. Only indirect means can be used to detect failures. Second, materials in hospitals are used very quickly after being sterilized. Unlike commercially produced materials and drugs, they are not quarantined until proven safe. Materials sterilized in hospitals are sometimes used while still hot from the sterilzer. Finally, unsterile items normally produce a delayed reaction. Three or four days may easily elapse before the unsterile goods cause their damage, and probably several more days would elapse before the cause of trouble was pinned down.

Sterilization failure may be due to human error (packs too large or wrapped too tightly, too many packs crowded into sterilizer, by-passing the sterilizer with several packs, etc.). It may also be due to sterilizer malfunction (plugged lint screen, clogged exhaust line, defective air release valve or steam trap, etc.). Nearly all of these troubles result in cool air pockets being trapped with packs. While vacuum sterilizers are constructed to eliminate air pockets through use of a vacuum cycle, a leaky gasket on inefficient vacuum pump can leave small amounts of air which pocket at the center (or most dense portion) of packs.

There are various mechanical and biological devices and methods presently available for testing sterilization apparatus. The most widely used of these include.

1. Bacteriological sampling of the materials after they have been processed through the sterilizer. This is the only way to directly prove that a particular item is sterile. However, in performing the test, the sample is usually contaminated, and large numbers of tests are required to insure that an adequate statistical sample has been taken. Such sampling is not generally considered practical for hospital purposes.

2. Challenge spores. These are highly resistant bacterial spores (usually *Bacillus stearothermophilus* for steam sterilizers) impregnated on paper strips, disks, or carried in a culture media. It is assumed that when these highly resistant bacteria are killed, all other forms of microbial life are also killed. It appears that this method, involving sufficient numbers of samples and challenge spores for each load of the sterilizer, is not economically feasible for hospitals.

3. Autoclave monitors. These devices are placed at the center of all packs, or at least the largest packs. When steam penetrates to the center, a color change or melting of a pellet enclosed in a glass tube occurs. When the packs are opened for use, the user can immediately check for steam penetration. There are two general types of these monitors —a. Color change ink printed on pasteboard, and b. Pellet-in-glass-tube types — these melt at a very exact temperature and thus give assurance that full temperature steam has penetrated to the center of packs. These monitors provide an indication of the temperature at the point in the pack where they are positioned, but cannot provide an indication of the uniformity of the temperature throughout the pack.

4. Sterilizer temperature recorder and gauges. These devices measure temperature in the sterilizer's exhaust line. While they detect many serious malfunctions of the sterilzer, they cannot measure conditions at the critical center of packs, where air pockets occur. It is, therefore, still essential that center of pack monitors be used.

5. Autoclave indicating tape. This tape is very useful to discriminate packs which have been processed through the sterilizer from those which have not. It has a time-temperature factor very similar to most paper monitors which change color and is economical to use. However, the ink on this tape and many paper monitors may change color at a temperature below that specified for normal sterilization cycles.

6. Bowie-Dick Test. The purpose of the test is to measure the uniformity of steam penetration to the center of dressing packs. It cannot measure temperature achieved at center of packs so cannot replace autoclave monitors. It consists of crossing several strips of autoclave indicating tape on a sheet of paper, then placing this at the center of a test pack. The pack is run through a normal cycle, then the tape is examined for uniformity of color change. This test has a serious limitation in its failure to distinguish between high temperatures for a short time period or lower temperatures for a longer period of time.

SUMMARY OF THE INVENTION

It is apparent from the foregoing background that there is a need for a simple device for testing the level, uniformity and duration of the temperature in sterilization apparatus. The device of the present invention is adapted to fulfill this need. Also, it is simple in construction, economical, easy to use and reliable in operation.

The device of the present invention is adapted to test the level, uniformity and duration of the temperature in a sterilization apparatus, such as a steam sterilizer or the like. The device of the present invention is adapted to fulfill this need. Also, it is simple in construction, economical, easy to use and reliable in operation.

The device of the present invention is adapted to test the level, uniformity and duration of the temperature in a sterilization apparatus, such as s a steam sterilizer or the like. The device comprises a unitary support means, such as a sheet of paper or cardboard, adapted to be positioned within or upon a pack or an article to be sterilized in the sterilization apparatus.

First temperature responsive means, such as a tape or printed pattern, is arranged in a predetermined manner on one surface of the support means. The first means is adapted to change condition, e.g., color, when exposed to a predetermined temperature to indicate the uniformity of the temperature to which the support means is exposed in the sterilization apparatus. By correct choice of commonly known responsive materials, this first means may also be used to determine the uniformity of steam saturation (moisture).

A second temperature responsive means, such as pellet-in-glass tube type indicator, is mounted on the support means substantially at the center portion thereof. In practice, the second means changes condition when exposed to a selected temperature for a predetermined time period, thereby indicating whether the center portion of the support means has been exposed to the selected temperature for a sufficient time period. The second means may also be used to indicate excessive conditions and/or temperature.

With the use of the present invention, therefore, it is possible to conveniently check the level, uniformity and duration of the temperature in a sterilization apparatus, thereby ensuring that the articles placed in such apparatus are being adequately sterilized.

BRIEF DESCRIPTION OF THE DRAWING

The drawing is a plan view of a device for testing sterilization apparatus constructed in accordance with the principles of the present invention.

DESCRIPTION OF THE PREFERRED EMBODIMENT

As shown in the drawing, the device 10 of the present invention for testing sterilization apparatus generally comprises a support means 12, first temperature responsive means 14 and second temperature responsive means 16.

The support means 12 preferably is of unitary-flat form. As an illustrative example, the support means 12 may be formed of a flat sheet of paper or cardboard of a size suitable to be conveniently positioned within or on packs or articles to be placed in the sterilization apparatus. Within the scope of the present invention, the support means 12 may have any suitable construction and may be made of any suitable material.

The first temperature responsive means preferably comprises a tape secured to or a pattern printed on or applied to one surface of the support means and arranged in a predetermined manner thereon. The tape or pattern is formed of a material that is adapted to change condition, e.g., color, when exposed to a predetermined temperature. So that the first temperature responsive means 14 can indicate the uniformity of the temperature to which the support means 12 is exposed in the sterilization apparatus, the tape or pattern preferably extends from the center portion to the edge portions of one surface of the support means. An example of a preferred pattern is shown in the drawing wherein the first temperature responsive means extends in an X pattern from the center portion of the support means 12 to each of the corners thereof. However, the pattern might be concentric circles, continuous lines, a checkerboard pattern, or any other suitable patterns.

The second temperature responsive means 16 is mounted on the support means substantially at the center portion thereof and preferably comprises an element 18 which will change condition when exposed to a selected temperature for a predetermined time period, thereby indicating whether the center portion of the support means has been exposed to the selected temperature for a sufficient time period within te sterilization apparatus. Preferably, the second temperature responsive means 16 is a transparent tube, formed of glass or the like, and the element 18 is a fusible element designed to fuse or melt when exposed to the selected temperature for the predetermined time period. However, this second temperature responsive element may also be a transparent envelope containing the fusible pellet, a temperature responsive ink imprinted on a label, or other time-temperature responsive device.

In operation, the testing device 10 of the present invention is placed within the center portion of a pack of towels or the like to be sterilized in the sterilization apparatus. After the pack has been treated in the sterilization apparatus, the testing device 10 is removed from the pack and inspected to test the level, uniformity and duration of the temperature in the sterilization apparatus at the center portion of the pack. The purpose of the first temperature responsive means 14 is to indicate whether the support means 12 has been exposed to the predetermined temperature in a uniform manner over its entire area. This can be ascertained by inspecting the tape or pattern on the first temperature responsive means. If the tape or pattern has undergone the same color change at the center and edge portions of the support means, this indicates a uniform exposure to the predetermined temperature at the center portion of the test pack. If correctly chosen, the color change will also indicate uniformity of steam saturation (moisture). If the color change is not uniform on the tape or pattern, this indicates improper sterilization of the test pack owing to inadequate temperature or moisture exposure at certain points in the center portion of the test pack where the support means was positioned.

Other than uniformity of temperature exposure, it is important to ascertain whether a sufficient temperature is reached within the sterilization apparatus for a sufficient period of time to accomplish adequate sterilization. In some cases, it is also desirable to detect excessive temperature due to superheating. An inspection of the second temperature responsive means 16 at the center portion of the support means indicates whether a selected temperature has been reached for a predetermined time period. If the element 18 is fused within the tube 16, this indicates that the selected temperature was reached for the period of time sufficient to accomplish adequate sterilization of the test pack. If the element 18 is not fused, this is an immediate indication that either the selected temperature was not reached at all or that the center portion of the support means or the test pack was not exposed to the selected temperature for a sufficient period of time.

It will be readily seen, therefore, that the device of the present invention for testing sterilization apparatus provides an immediate and positive indication of the level, uniformity and duration of the temperature in a sterilization apparatus to ensure that the packs or articles within the sterilization apparatus are being properly sterilized.

What is claimed is:

1. A device for testing the level, uniformity and duration of the temperature in apparatus for sterilizing articles used in hospitals and the like to indicate if incomplete sterilization has occurred owing to the formation of air pockets or the like, said device comprising:
   unitary support means of substantially flat sheet form adapted to be placed adjacent to articles to be sterilized in said sterilization apparatus,
   first temperature responsive means mounted in a predetermined pattern on one surface of said support means and extending from the center portion to the edge portions thereof, said first means covering a substantial area of said one surface and extending in more than one direction edge to edge on said one surface, said first means being adapted to change conditions when exposed to a predetermined temperature to indicate the uniformity of the temperature to which said one surface of said support means is exposed, and
   second temperature responsive means mounted on said support means substantially at the center portion thereof, said second means comprising a material that changes condition when exposed to a selected temperature for a predetermined time period, whereby said second means indicates whether said selected temperature is reached for said predetermined time period at the center portion of said support means.

2. The testing device of claim 1 wherein said support means is formed of paper.

3. The testing device of claim 1 wherein said first means comprises a temperature responsive material imprinted on said one surface of said support means.

4. The testing device of claim 1 wherein said first means comprises a tape of temperature responsive material secured to said one surface of said support means.

5. The testing device of claim 1 wherein said second temperature responsive means comprises a fusible material that fuses when exposed to said selected temperature for said predetermined time period.

6. The testing device of claim 5 wherein said second means further comprises a transparent envelope enclosing said fusible material, said envelope being secured to said support means substantially at the center portion thereof.

* * * * *